United States Patent
Krenz

(10) Patent No.: US 6,433,772 B1
(45) Date of Patent: Aug. 13, 2002

(54) METHOD AND APPARATUS FOR CONTAINING A CURSOR ON A COMPUTER USED IN HARSH ENVIRONMENTS

(75) Inventor: Michael J. Krenz, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/337,833

(22) Filed: Jun. 22, 1999

(51) Int. Cl.[7] ............................. G09G 5/00; G09G 5/08

(52) U.S. Cl. ..................... 345/156; 345/157; 345/160

(58) Field of Search ........................... 345/156, 157, 345/160, 161, 163

(56) References Cited

U.S. PATENT DOCUMENTS

| | | | | |
|---|---|---|---|---|
| 4,724,715 A | * | 2/1988 | Culver | 345/156 |
| 4,961,138 A | * | 10/1990 | Gorniak | 345/161 |
| 4,982,618 A | * | 1/1991 | Culver | 345/156 |
| 5,270,690 A | * | 12/1993 | Oberg | 345/163 |
| 5,635,926 A | * | 6/1997 | Li | 345/157 |

* cited by examiner

Primary Examiner—Richard Hjerpe
Assistant Examiner—Duc Dinh Q
(74) Attorney, Agent, or Firm—Nathan O. Jensen; Kyle Eppele

(57) ABSTRACT

An apparatus and method for manipulating a computer cursor in harsh environments which uses a movable grip device disposed about a stationary member where movement of the movable grip is limited by controllable resistance as a function of force applied to said movable grip.

8 Claims, 1 Drawing Sheet

METHOD AND APPARATUS FOR CONTAINING A CURSOR ON A COMPUTER USED IN HARSH ENVIRONMENTS

FIELD OF THE INVENTION

The present invention generally relates to computers and more particularly relates to cursor controllers for such computers and even more particularly relates to methods and apparatus of controlling cursors in harsh environments.

BACKGROUND OF THE INVENTION

In the past, designers of avionics displays and computer systems have endeavored to provide an increased use of cursor controlled flight deck operations. These cursor controlled computers can reduce the required number of control panels needed in an aircraft cockpit, thereby further providing for increased flexibility in system design as well as increased system redundancy. While these cursor-controlled computers have many advantages, they also have significant drawbacks.

The cockpit is not a mechanically static or benign environment. In-flight turbulence, forces of impact upon landing and. other forces resulting from maneuvering the aircraft can be substantial, especially for smaller aircraft and most especially, for fighter aircraft used in operation on-board aircraft carriers. These forces can cause mechanical displacement of the pilot's hand while cursor manipulation is being attempted, thereby resulting in undesirable cursor movement or an inability to generate any cursor movement.

Consequently, there exists a need for improved methods and apparatuses for controlling cursors in harsh environments.

SUMMARY OF THE INVENTION

It is an object of the present invention to provide a cursor controller having an improved control characteristic, especially when used in harsh environments and during periods of substantial mechanical and physical interference with the operator's manual control capabilities.

It is a feature of the present invention to utilize a multi-axis adjustable cursor controller.

It is an advantage of the present invention to simultaneously provide for stabilization of the user's hand and control of a cursor.

It is another feature of the present invention to include a dynamic movement resistance characteristic.

It is another advantage of the present invention to provide for increased control of a cursor during periods of high mechanical and physical interference with the operator's hand movements.

The present invention is an apparatus and method for controlling a cursor which is designed to satisfy the aforementioned needs, provide the previously stated objects, include the above-listed features and achieve the already articulated advantages. The present invention is carried out in a "cursor contact loss-less" manner in a sense that the time that a loss of contact and/or control between the operator's hand and the cursor controller has been greatly reduced.

Accordingly, the present invention is a cursor controller having a stationary member along which a movable member is translated and rotated to provide cursor control signals.

BRIEF DESCRIPTION OF THE DRAWINGS

The invention may be more fully understood by reading the foregoing description of the preferred embodiments of the invention, in conjunction with the appended drawing wherein:

The FIGURE is a simplified cut-away diagram of a cursor controller of the present invention, showing a mounting bar and a movable grip, having a cut-away portion therein, revealing portions of the mounting bar.

DETAILED DESCRIPTION

Figure 1:
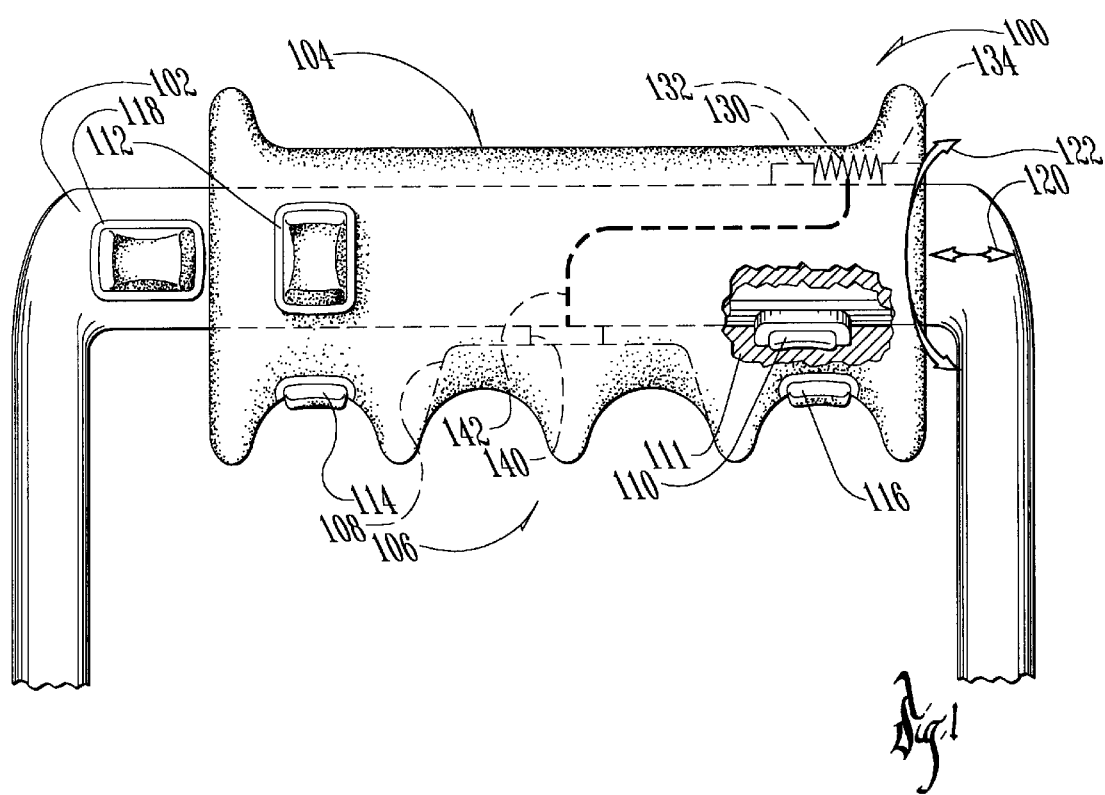

Now referring to the drawing wherein like numerals refer to like matter throughout, there is shown a system of the present invention, generally designated 100, having a stationary mounting bar 102, which is preferably rigidly mounted to a portion of the aircraft adjacent to the pilot or other flight crew member. The description herein focuses upon cursor controllers used in the cockpit of an aircraft because it is believed that many of the features of the present invention are particularly well suited for use in an aviation environment. However, it should be understood that other environments are equally applicable, and they are intended to be included within the scope of the present invention. Stationary mounting bar 102 may be attached in a secure manner to the pilot's seat assembly, cockpit structural members stable within the cockpit, and/or other fixed or detachably fixed members in the cockpit. Disposed about stationary mounting bar 102 is movable grip 104, which is capable of motion along stationary mounting bar 102 in a direction depicted by translation direction line 120 and further depicted by rotation direction line 122. Movable grip 104 may be made of any material having suitable qualities. Preferably, movable grip 104 has its motion along stationary mounting bar 102 restricted by some dampening mechanism, such as a spring 132, which may be any type of mechanism known for such purposes, such as, but not limited to, hydraulic pistons, piezo-electric mechanisms and others. Spring 132 is shown constrained by first stop 130 and second stop 134. Movable grip 104 is shown having a depressible squeeze detection region 108 therein for detecting the amount of pressure imparted to movable grip 104 by the user's hand. Various forms of mechanisms could be used in depressible squeeze detection region 108, such as a pressure sensor 140, which could be any well-known mechanical and electrical sensors. The pressure sensor 140 in depressible squeeze detection region 108 could output a sensor signal on pressure sensor signal line 142, which is used to control the resistance of spring 132 or any substitute for spring 132. This would allow for a dampening of the motion of movable grip 104 along stationary mounting bar 102 during periods of strong turbulence or other periods of high interference with the user's ability to control the cursor controller 100. Preferably, movable grip 104 has its rotational motion also resisted and controlled in a similar manner. The apparatus to accomplish this could be the exact same apparatus as described above, but with a spring 132 or material which has spring-like characteristics in at least two dimensions. Alternatively, an additional apparatus could be included which is oriented and configured for use with respect to rotational motion. Cursor controller 100 is shown having first cursor button 112, second cursor button 114, and third cursor button 116 disposed on movable grip 104. Also shown is fourth cursor button 118 disposed on stationary mounting bar 102. Various locations and numbers of cursor buttons may be used depending upon the particular desires and needs of any particular application. Third cursor button 116 is shown disposed adjacent to a cut-away region 111 of movable grip 104, which reveals cursor button switch member 110 disposed on stationary mounting bar 102. Third cursor button 116 is capable of translational motion toward and away from cursor button switch member 110 to effectuate actuation of cursor button switch member 110.

However, various other switching schemes could be deployed, such as electrical, optical, or other sensors. Cursor button switch member 110 is merely representative of the many various forms which are well known in the art. Additionally, cursor buttons 112, 114, 116 and 118 perform functions well known in the art, such as generation of cursor selection signals and other signals known to relate to computer mice and other cursor controllers.

While discrete buttons and switches, such as cursor button switch member 110 and third cursor button 116, are described herein, it is contemplated that a single deflection sensor, such as a finger-tip mouse controller tip as is commonly found extending between the keys of many laptop computers, could be used. Such a deflection sensor could also be used for pressure sensor 140 individually or as performing other additional functions, such as cursor button switch member 110 and third cursor button 116.

In operation, the apparatus and method of the present invention could function as follows:

A pilot, flight crew member or other user could grasp movable grip 104 and move it in a direction shown as translation direction line 120 to effect a cursor movement in the same direction. The user then could rotate movable grip 104 in a direction shown as rotation direction line 122 to effect a cursor movement in direction orthogonal to translation direction line 120. Stationary mounting bar 102 can be mounted in various positions and orientations about the user and the direction of cursor movement in response to motion of the movable grip 104 in the directions of translation direction line 120 and rotation direction line 122 are a matter of design choice. During time of high turbulence, the pilot may squeeze movable grip 104 with greater force than normal. The pressure sensor 140 in depressible squeeze detection region 108 can detect the extra squeezing force and may generate a sensor signal on pressure sensor signal line 142, which is used to control the resistance of spring 132 or any substitute mechanism for spring 132. Similarly, pressure sensor 140 can control resistance of rotational motion. Depressible squeeze detection region 108 is shown disposed in a central region of the finger engagement side 106 of movable grip 104. However, depressible squeeze detection region 108 could be positioned in any area upon movable grip 104 depending upon any particular needs or desires for any particular application. Similarly, depressible squeeze detection region 108 and pressure sensor 140 could be substituted with an additional button or other control mechanism. Throughout this description, translational motion limitations and control are discussed in depth. However, it should be understood that the present invention applies equally to rotational motion limitation and control, which too can be accomplished in many ways, including those described herein for translational motion.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

I claim:

1. An apparatus for controlling a cursor, the apparatus comprising:

a stationary member having a first segment with a first dimension and a second dimension;

a movable device disposed around portions of said stationary member, said movable device generating cursor control signals in response to relative motion of said movable device with respect to said stationary member;

said movable device generating a first signal when motion occurs along said first dimension and generates a second signal when motion occurs along said second dimension;

said movable device having a resistance characteristic which relates to resistance to relative motion of said movable device with respect to said stationary member;

said movable device is a rotatable grip, in which rotation occurs around said stationary member; and a cursor select button disposed thereon for generating cursor select signals.

2. An apparatus of claim 1 further including a pressure sensor for sensing a pressure characteristic of force applied to said movable device and generating a pressure signal in response thereto.

3. An apparatus of claim 2 wherein said resistance characteristic is responsive to said pressure signal.

4. An apparatus of claim 3 wherein said resistive characteristic relates to rotation of said movable device about said stationary member, and where said resistive characteristic is responsive to said pressure signal.

5. A cursor control device comprising:

means for receiving a grasping human hand, wherein said means for receiving is a rotatable grip;

means for sensing a motion of said means for receiving a grasping human hand and generating cursor control signals in response thereto;

means for supporting said means for receiving a grasping human hand, said means for supporting including means for rigid attachment to a predetermined structure in a cockpit of an aircraft;

means for limiting motion of said means for receiving a grasping human hand;

means for generating a pressure signal in response to pressure applied to said means for receiving;

said means for limiting motion of said means for receiving is responsive to said pressure signal; and means for generating a cursor selection signal.

6. An apparatus of claim 1 wherein said resistance characteristic is related to a spring.

7. An apparatus of claim 1 wherein said resistance characteristic is responsive to a piezo-electric element.

8. An apparatus of claim 1 wherein said resistance characteristic is responsive to a hydraulic member.

* * * * *